(12) United States Patent
Cummings et al.

(10) Patent No.: US 7,508,335 B2
(45) Date of Patent: Mar. 24, 2009

(54) MULTIPLE SENSOR PROCESSING

(75) Inventors: Steven T. Cummings, Amherst, NH (US); George A. Blaha, Arlington, VA (US); Larry L. Stern, Bethesda, MD (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/941,402

(22) Filed: Nov. 16, 2007

(65) Prior Publication Data

US 2008/0150787 A1 Jun. 26, 2008

Related U.S. Application Data

(60) Provisional application No. 60/870,923, filed on Dec. 20, 2006.

(51) Int. Cl.
*G01S 13/66* (2006.01)
(52) U.S. Cl. .............................. 342/59; 342/95; 342/96; 342/97; 342/195
(58) Field of Classification Search .................. 342/59, 342/60, 85, 95–97, 195
See application file for complete search history.

(56) References Cited

U.S. PATENT DOCUMENTS

| | | | |
|---|---|---|---|
| 5,138,321 A | | 8/1992 | Hammer |
| 5,696,503 A | * | 12/1997 | Nasburg ..................... 340/933 |
| 5,961,571 A | * | 10/1999 | Gorr et al. ................... 701/207 |
| 6,922,664 B1 | * | 7/2005 | Fernandez et al. ............. 703/13 |
| 7,319,383 B2 | * | 1/2008 | Howard ....................... 340/531 |
| 2006/0220951 A1 | | 10/2006 | Thome et al. |
| 2008/0150787 A1 | * | 6/2008 | Cummings et al. ............. 342/59 |
| 2008/0298477 A1 | * | 12/2008 | Classon ...................... 375/260 |

FOREIGN PATENT DOCUMENTS

| | | | |
|---|---|---|---|
| EP | 1 533 628 A | | 5/2005 |
| JP | 01035391 A | * | 2/1989 |
| JP | 2002 014162 A | | 1/2002 |
| WO | WO 01/09641 A | | 2/2001 |
| WO | WO 2006/097771 A | | 9/2006 |

OTHER PUBLICATIONS

Notification of transmittal of the International Search Report dated Nov. 12, 2008, PCT/US2007/086590.
The International Search Report dated Nov. 12, 2008, PCT/US2007/086590.
Written Opinion of the International Searching Authority dated Nov. 12, 2008, PCT/US2007/086590.
Blackman S. et al.: "Multiple Sensor Tracking: Issues and Methods", Design and Analysis of Modern Tracking Systems, Jan. 1, 1999, pp. 595-659, XP002277517, pp. 610-611; figure 9.9.

\* cited by examiner

*Primary Examiner*—John B Sotomayor
(74) *Attorney, Agent, or Firm*—Daly, Crowley, Mofford & Durkee LLP (57) ABSTRACT

A method of multiple sensor processing includes receiving, at a first sensor system, track data from a second sensor system, comparing track data from the first sensor system to the track data from the second sensor system to determine if a track will be within a field of view of the first sensor system during a time period, determining, at a first sensor system, predicted quality of tracks based on the track data and broadcasting the predicted quality of tracks. The method also includes receiving predicted quality of tracks from the second sensor system and determining a first set of tasks based on the predicted quality of tracks determined by the first sensor system and the predicted quality of tracks received from the second sensor system.

21 Claims, 5 Drawing Sheets

MULTIPLE SENSOR PROCESSING

RELATED APPLICATIONS

This application claims priority to provisional application Ser. No. 60/870,923, entitled "MULTIPLE SENSOR PROCESSING," filed Dec. 20, 2006, which is incorporated herein in its entirety.

BACKGROUND

Sensor systems such as radar systems utilize resources to detect objects. Some sensor systems may be adjusted to control the utilization of resources to detect and track objects. One resource may be a type of waveform propagated from the sensor system. Another type of resource may include the amount of energy available to propagate the waveform. Other resources may include an amount of processing time dedicated to process a sensor contact. Other resources may include determining a number of objects to observe.

The challenge in determining a resource utilization develops when resources are in conflict. For example, in a radar system, a first waveform tracks objects better than using a second waveform. However, the radar system may expend a certain energy transmitting the first waveform to track contacts but expend less energy transmitting the second waveform. Determining how to allocate the resources is a challenge for a single sensor system but the challenge is compounded in a sensor network environment having more than one sensor system.

SUMMARY

In one aspect, the invention is a method of multiple sensor processing. The method includes receiving, at a first sensor system, track data from a second sensor system, comparing track data from the first sensor system to the track data from the second sensor system to determine if a track will be within a field of view of the first sensor system during a time period, determining, at a first sensor system, predicted quality of tracks based on the track data and broadcasting the predicted quality of tracks. The method also includes receiving predicted quality of tracks from the second sensor system and determining a first set of tasks based on the predicted quality of tracks determined by the first sensor system and the predicted quality of tracks received from the second sensor system.

In another aspect the invention is an article including a machine-readable medium that stores executable instructions used in multiple sensor processing. The instructions cause a machine to receive, at a first sensor system, track data from a second sensor system, compare track data from the first sensor system to the track data from the second sensor system to determine if a track will be within a field of view of the first sensor system during a time period, determine, at a first sensor system, predicted quality of tracks based on the track data and broadcast the predicted quality of tracks. The instructions also cause a machine to receive predicted quality of tracks from the second sensor system and determine a first set of tasks based on the predicted quality of tracks determined by the first sensor system and the predicted quality of tracks received from the second sensor system.

In a further aspect, the invention is an apparatus used in multiple sensor processing. The apparatus includes circuitry to receive, at a first sensor system, track data from a second sensor system, compare track data from the first sensor system to the track data from the second sensor system to determine if a track will be within a field of view of the first sensor system during a time period, determine, at a first sensor system, predicted quality of tracks based on the track data and broadcast the predicted quality of tracks. The apparatus also includes circuitry to receive predicted quality of tracks from the second sensor system and determine a first set of tasks based on the predicted quality of tracks determined by the first sensor system and the predicted quality of tracks received from the second sensor system.

DETAILED DESCRIPTION

Figure 1:
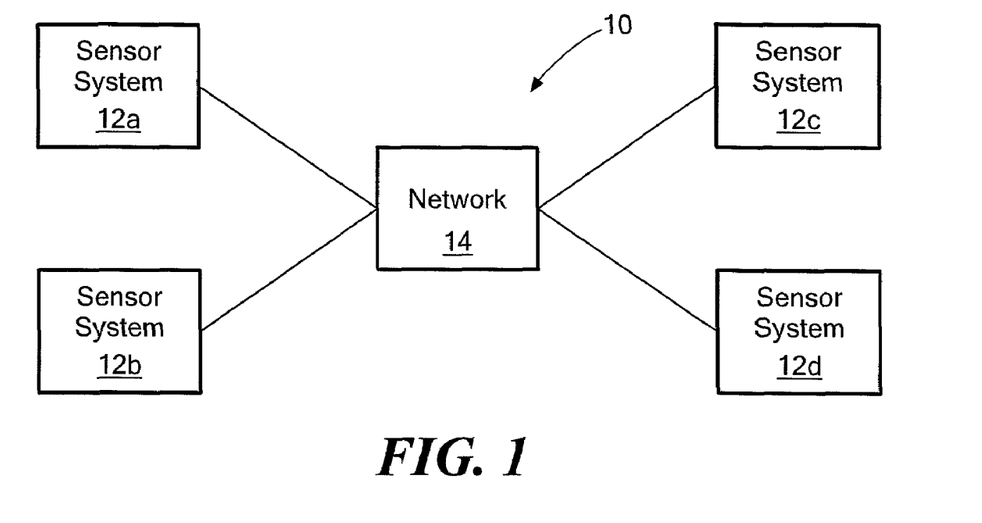
FIG. 1 is a block diagram of an example of a sensor network.

Referring to FIG. 1, a sensor network 10 includes sensor systems (e.g., a sensor system 12a, a sensor system 12b, a sensor system 12c and a sensor system 12d) connected by a network (e.g., a wired network, a wireless network or a combination thereof). In one example, the sensor network 10 is a battlefield sensor network where each sensor system 12a-12d is used to detect and track sensor contacts (i.e., tracks), for example, enemy targets, friendly targets, unidentified targets and so forth. The sensor systems 12a-12d may include, for example, ground-based radar systems, air-based radar systems, sea-based radar systems, space-based radar systems or any combination thereof. In one example, the sensor systems 12a-12d may be a mix of different sensor systems having different bandwidths, spectra and be of different generations of sensor systems.

Each sensor system 12a-12d dedicates a certain amount of processing time to track a contact. Due to the speed at which some tracks may travel and the speed of processing required to monitor the tracks, sensor systems may not be able to track each and every track efficiently enough to meet mission objectives (e.g., defending a ship from attack). A central resource manager that monitors and controls the sensor systems has performed balancing and control of the sensor systems in conventional systems. However, the central resource manager adds to processing response time. In contrast, the novel sensor network architecture 10 is a distributed sensor architecture having no central resource manager to manage the processing of the sensor systems 12a-12d, but rather, the sensor systems contribute to the overall management of the sensor network 10. For example, a sensor system 12a determines how to allocate resources to track a contact based on data received from the other sensor systems 12b-12d. The other sensors systems 12b-12d are each also determining how to allocate resources to track a contact based on the data received by the other sensor systems.

Figure 2:
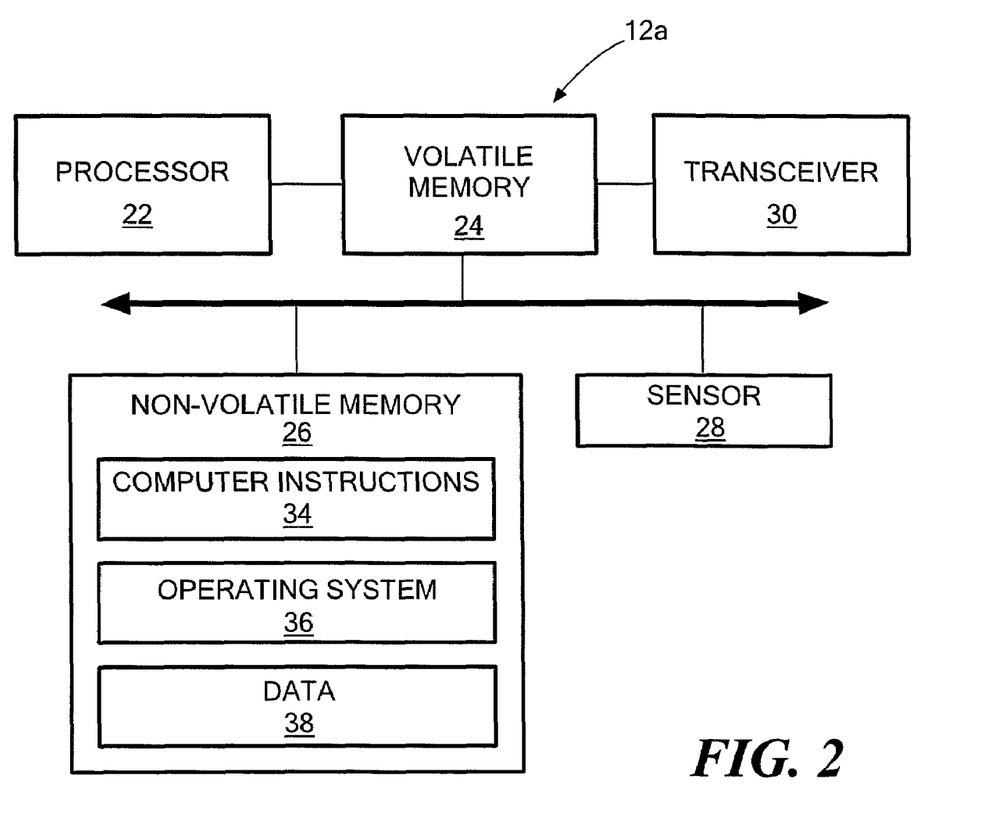
FIG. 2 is a block diagram of an example of a sensor system.

FIG. 2 depicts a general sensor system, for example, the sensor system 12a (FIG. 1). The sensor system 12a includes a processor 22, a volatile memory 24, a non-volatile memory 26 (e.g., a hard disk), a sensor 28 and a transceiver 30. The non-volatile memory 26 includes computer instructions 34, an operating system 36 and data 38. The sensor 28 detects contacts. For example, the sensor 28 is a radar. The transceiver 30 allows for communications to and from other sensor systems 12b-12d through the network 14

Figure 3:
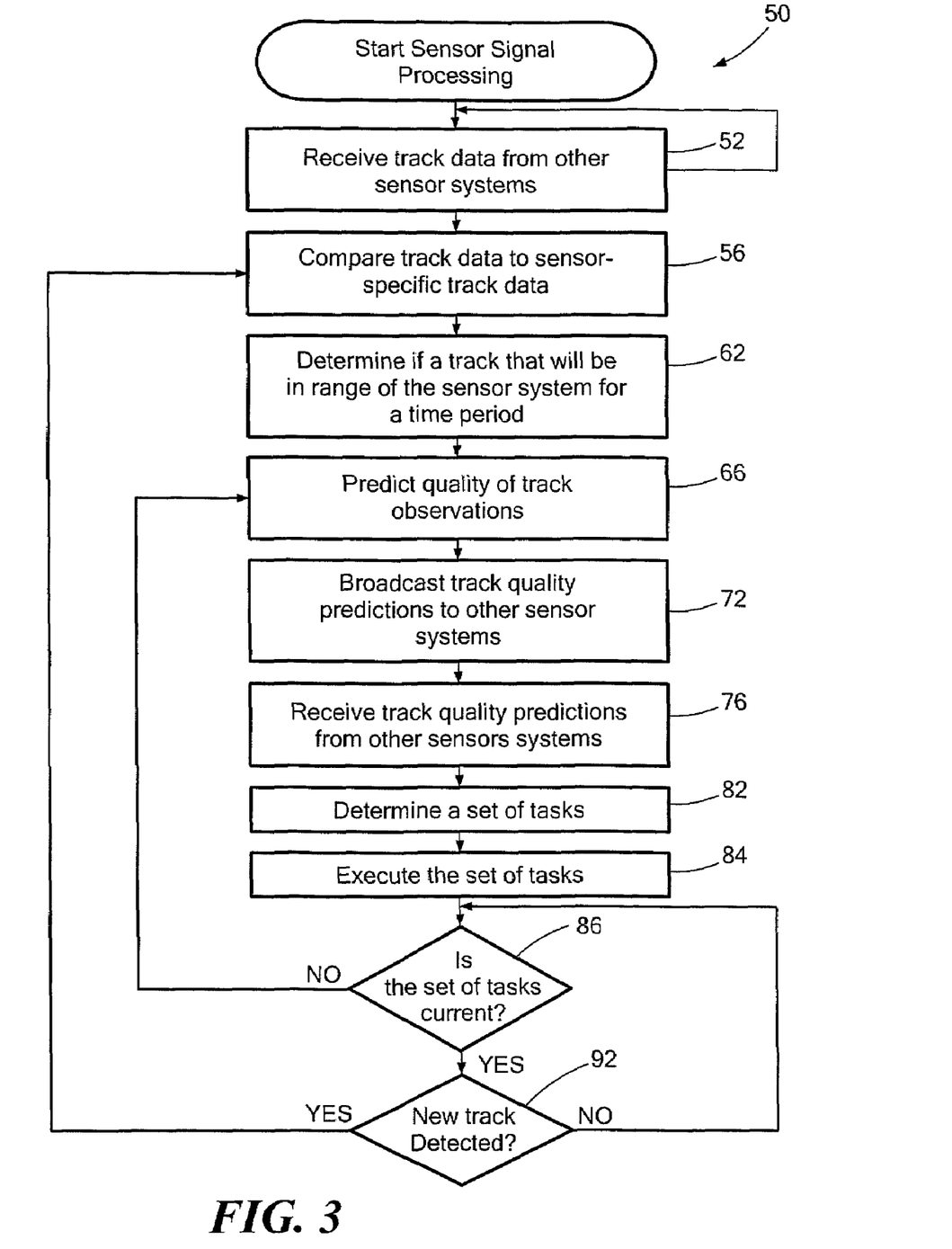
FIG. 3 is a flowchart of an example of a process performed by each sensor system in the sensor network.

Referring to FIG. 3, a process 50 is an example of a process performed by each of the sensor systems 12a-12d, for example, the sensor system 12a, to determine, for example, resource utilization of each sensor system in the sensor network 10. In one example, the computer instructions 24 (FIG. 2) are executed by the processor 22 (FIG. 2) out of the volatile memory 24 (FIG. 2) to perform process 50.

Figure 4:
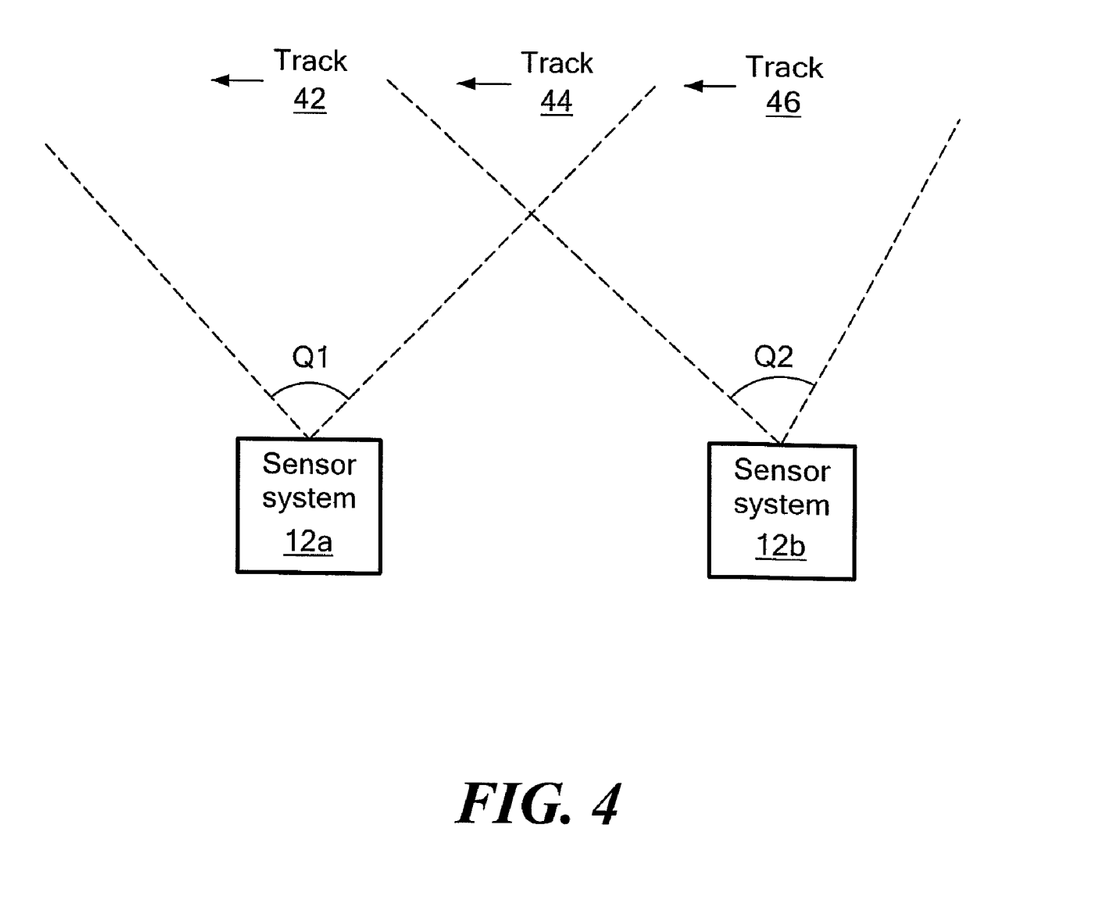
FIG. 4 is a diagram of a sensor network environment.

Process 50 receives track data from the other sensor systems (52). For example, the sensor system 12a receives track data from the other sensor systems 12b-12d through the transceiver 30 from the network 14 (FIG. 2). In one example, as in FIG. 4, a track 42 and a track 44 are in a field of view (i.e., viewing angle), Q1, of the sensor system 12a and the track 44 and a track 46 are in a field of view, Q2, of the sensor system 12b. The sensor system 12b would send track data on the track 44 and the track 46 to the sensor system 12a.

Process 50 compares the track data to sensor specific track data from the sensor system (56). The sensor specific tracks relate to tracks specifically observed by the sensor system even though other tracks may be in the field of view of the sensor system. For example, the sensor system 12a compares the tracks that the sensor system 12a observed with the tracks observed by the other sensor systems 12b-12d. In one example, as in FIG. 4, the sensor system 12a, for resource allocation reasons, is only observing track 42 even though track 44 is in its field of view Q1. The sensor system 12b is observing the tracks 44, 46.

Process 50 determines if a track will be in range of the sensor system during a future time period (62). For example, the sensor system 12a determines if a track will be in its range for a time period (e.g., a schedule period). In one example, as in FIG. 4, the sensor system 12a would determine if track 42, 44, 46 will be in its field of view Q1 in the time period. In this example, the sensor system 12a determines that tracks 44, 46 will remain in the field of view Q1 and that track 46 will be in the field of view Q1 during the time period.

Process 50 predicts quality of track observations and resource costs (66). For example, the quality of a track observation may be represented by a track covariance matrix as well as a probability of future resolution. For instance, the track covariance matrix represents the estimated error variances in range, range rate, azimuth, azimuth rate, elevation, and elevation rate of the tracked target as well as the covariances between all of these quantities, e.g., the error bounds of range and range rate due to correlation between these quantities.

The probability of future resolution refers to the proposed system predicting where the tracked objects will be in the future and estimating the probability of each sensor in the network being able to resolve, that is, independently measure, the position of the tracked objects based on the individual sensor's capabilities. The resource costs may be quantified as the percentage of the total duty or occupancy limit that is expended within a resource period in order to detect the track. If multiple options exist for observing a track (e.g., multiple waveforms), the observation quality and resource costs are predicted for each option. In other examples, measurement quality and resource costs are predicted for more than one point in time.

Process 50 broadcasts the quality of track predictions to the other sensor systems (72). For example, sensor system 12a, broadcasts the quality of track predictions to the sensor systems 12b-12d through the network 14. Process 50 receives quality of track predictions from the other sensor systems (76). For example, sensor system 12a, receives the quality of track predictions from the sensor systems 12b-12d from the network 14.

Process 50 determines a set of tasks (82). For example, based on the quality of track predictions received from the sensor system 12b-12d and the quality of track predictions determined by the sensor system 12a, the sensor system 12a chooses a set of tasks (i.e., a plan) for each sensor system 12a-12d that minimizes a particular cost function (e.g., derived from priorities) while satisfying resource constraints. The set of tasks may include which tracks to observe. The set of tasks may also include what waveform to use to observe a track. In one embodiment, the other sensor system 12b-12d have also determined the set of tasks using processing 50 separately which is the same set of tasks as determined by the sensor system 12a.

Process 50 executes the set of tasks (84). For example, the sensor system 12a executes a portion of the set of tasks applicable to the sensor system 12a. In one embodiment, the other sensors system 12b-12d each executes the set of tasks applicable to their respective sensor system.

Process 50 determines if the set of tasks is current (86). If the set of tasks is not current, process 50 predicts quality of the track observations (66). If process 50 determines that the set of tasks is current, process 50 determines if there is a new track (92). If process 50 determines there is a new track, process 50 compares track data to sensor specific track data (56). If process 50 determines there is no new track, process 50 determines if the set of tasks is current (86).

Figure 5:
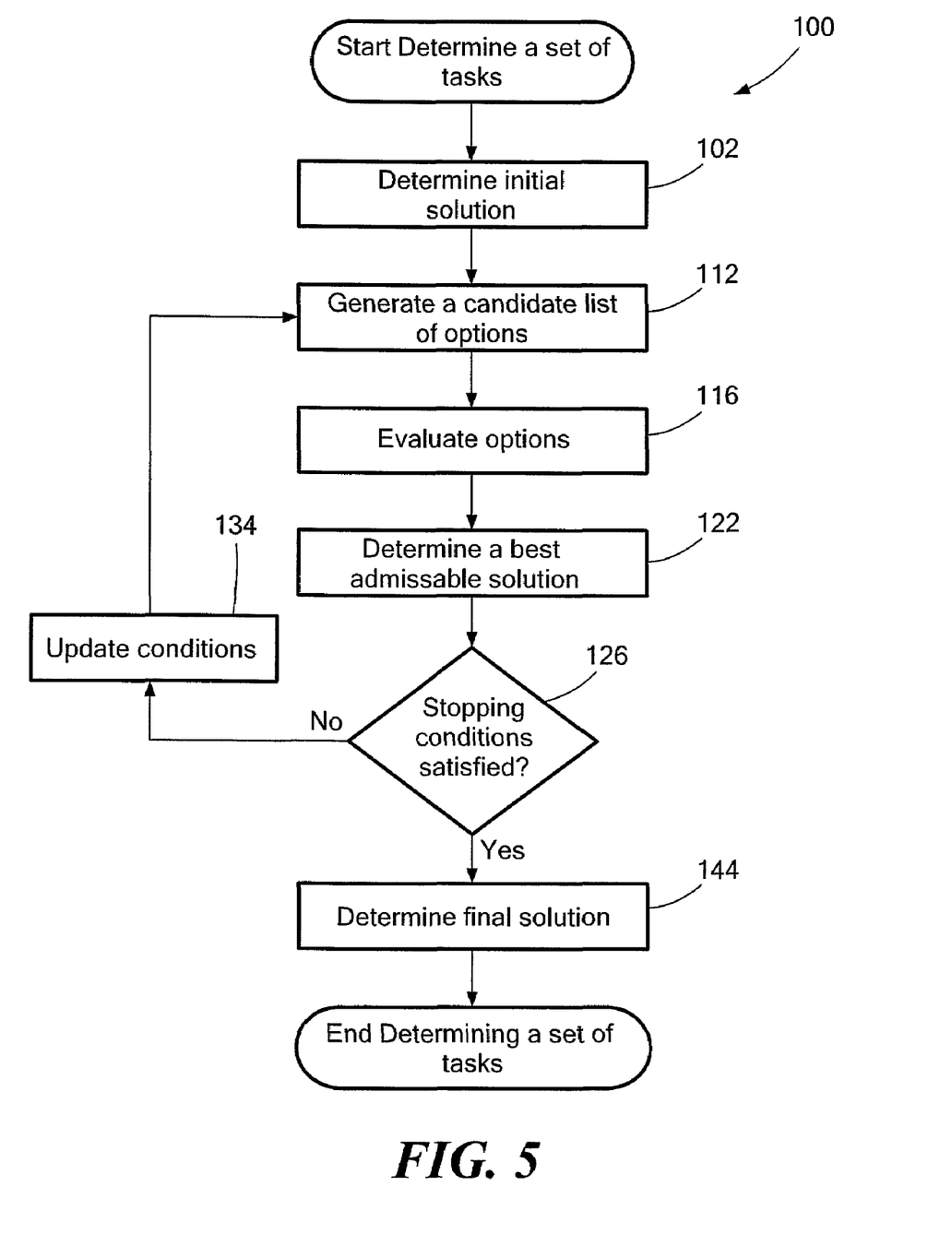
FIG. 5 is a flowchart of an example of a process to determine a set of tasks.

Referring to FIG. 5, an example of a process to determine a set of tasks (82) is a process 100. In general, there may be many combinatorial optimization techniques available to determine the set of tasks. A solution as used herein is the set of tasks. In one example, process 100 is a heuristic process.

Exact solution techniques usually find the globally optimum solution (ideal sensor tasking) if allowed to run to completion. However, for task selection problems that are sufficiently large (e.g., many sensors, many targets) it is generally impractical to allow an exact algorithm to run to completion. Instead, it is advantageous to make use of heuristic solution techniques which may not be guaranteed to find the globally optimum solution, but are designed to find near-optimal solutions quickly. Detailed descriptions of many exact and heuristic solution techniques are available in the prior art. One particular heuristic solution technique, a "Tabu search", may be implemented to solve the sensor task selection problem. The Tabu search is an iterative search method that augments the local search algorithm performed by the sensor system by employing a strategy to find global rather local (i.e., sensor system specific) optimum solutions. Process 100 determines an initial solution (102). For example, the initial solution to the sensor task selection problem is generated by choosing a feasible (can be achieved without exceeding 100% utilization of any one sensor system 12a-12d) solution in a deterministic way. Specifically, for each sensor system 12a-12d, all available options within a given scheduling period are collected for each sensor. The options are sorted with each scheduling period by resource utilization consumed by each option. The option with the least resource utilization for the entire scheduling period is selected to generate the initial solution. The initial schedule generated will be the initial point in the algorithm from which to proceed and find the "best" solution. The initial sensor task selection will yield a low-resource utilization.

In other examples, an alternate way of selecting the initial solution would be to use a non-deterministic method of generating the initial schedule. This offers the advantage of starting point diversity, which may improve solution quality if the cost function has a very large number of local minima over the solution space. An example of a non-deterministic way of selecting the initial solution is to randomly select the options for each scheduling period.

Process 100 generates a list of schedule options (112). The list of schedule options explored at each iteration is generated by considering the combinatorial neighborhood of the schedule options determined from the previous iteration. Specifically, the combinatorial neighborhood is defined as all options that may be obtained by changing a single option in the schedule by one step as described below. A step is defined as choosing the next higher or next lower resource utilization option.

Figure 6:
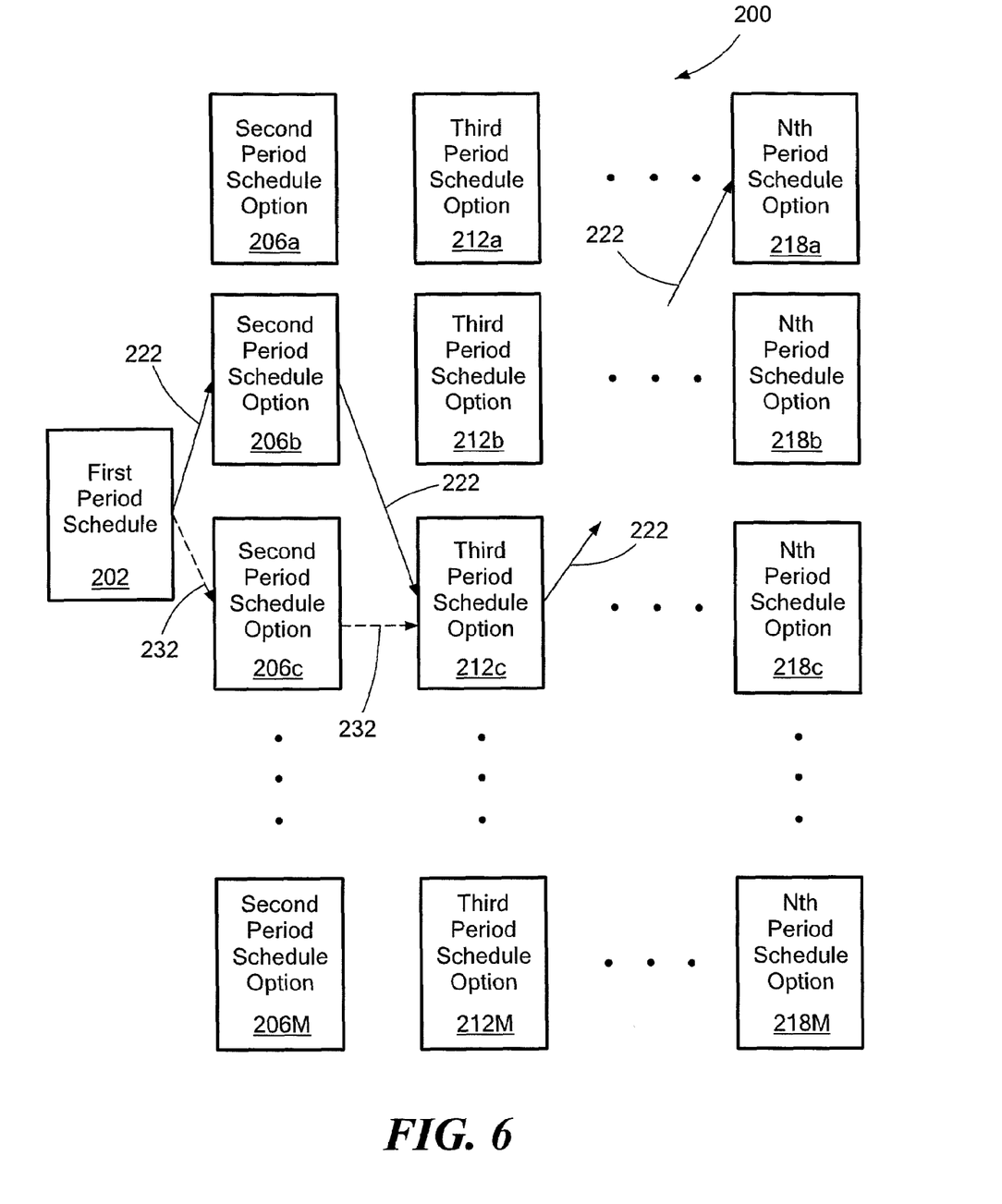
FIG. 6 is an example of a list of candidate solutions.

Referring to FIG. 6, a matrix 200 includes a first period schedule 202, a set of second period schedule options (e.g., a second period schedule option 206*a* a second period schedule option 206*b*, a second period schedule option 206*c*, . . . , and a second period schedule option 206M), a set of third period schedule options (e.g., a third period schedule option 212*a*, a third period schedule option 212*b*, a third period schedule option 212*c*, . . . , and a third period schedule option 212M) and a set of Nth period schedule options (e.g., an Nth period schedule option 218*a*, an Nth period schedule option 218*b*, an Nth period schedule option 218*c*, . . . , and an Nth period schedule option 218M). N represents the number of scheduling periods and M represents the number of schedule options (e.g., utilization choices per period).

In FIG. 6, the assumption is that there is M schedule options per N period. However, in other examples, each period may have a different schedule option per period. The schedule options 206*a*-206M, 212*a*-212M, 218*a*-218M represent possible resource utilizations for the corresponding scheduling period.

The first period schedule 202 represents the set of tasks to be performed in the first period as determined in processing block 102. Process 100 determines the best period schedule option for each subsequent time period. For example, in the second time period, the second period schedule option 206*a*-206M are selected one at a time to determine the best schedule option.

In one example, the dashed line path represents a "next-step" in the schedule option selection. In one iteration, the second period schedule 206*b* is chosen. In the next iteration the second period schedule 206*c* is chosen. In every iteration, only one scheduling option is being changed to pick the utilization closest to the "best" solution. For a given schedule option, the neighboring schedule options represent either lower or higher-resource utilization options. For example, the second period schedule option 206*c* has a lower resource utilization than the second period schedule option 206*b* while the second period schedule option 206*a*.

In one example, choosing schedule options along a solid line path 222 yields the "best" set of schedule option and the best solution would include the set of best schedule options. For example, the best solution includes the best schedule options such as the second period schedule option 206*b*, the third period schedule option 212*c* and the Nth period schedule option 218*a*.

Process 100 evaluates options (116). For example, each candidate neighborhood schedule options are evaluated by computing the future aggregate track error for the particular combination of sensor tasks, using the observation quality predictions made by each sensor. In addition, the feasibility of the schedule options is evaluated by computing the resource usage for the particular combination of sensor tasks.

Process 100 determines a best admissible solution (122). A solution is the best admissible solution once it becomes the "best" neighboring schedule option. In one example, a "best" neighboring schedule option yields lower cost and is feasible (e.g., does not exceed 100% utilization of any one sensor).

Process 100 determines if stopping conditions are met (126). For example, iterations are halted at a fixed number of iterations after a locally optimum solution is encountered. In other examples, substantially more sophisticated stopping conditions may be formulated that take into account details of the problem in addition to the computing time available before a solution is required.

If the stopping conditions are not met, process 100 updates the conditions (134). For example, the conditions may include neighboring schedule options which have already been selected by the algorithm so that neighboring schedules options are not visited in future iterations of the algorithm. The algorithm is designed to search for the global minimum and not stop at local minima. In order to accomplish this, a higher-cost subsequent schedule option may be selected as the best neighboring schedule option as long as it is feasible to execute.

If stopping conditions are met, process 100 uses a final solution (144). For example, process 100 uses the final schedule options. In one example, if subsequent schedule options become infeasible, the current schedule options are declared the global minima, i.e., the solution to the search.

Process 50 is not limited to use with the hardware and software of FIG. 2; it may find applicability in any computing or processing environment and with any type of machine or set of machines that is capable of running a computer program. Process 50 may be implemented in hardware, software, or a combination of the two. Process 50 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 50 and to generate output information.

The system may be implemented, at least in part, via a computer program product, (i.e., a computer program tangibly embodied in an information carrier (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform process 50. Process 50 may also be implemented as a machine-readable storage medium, configured with a computer program, where upon execution, instructions in the computer program cause the computer to operate in accordance with process 50.

The processes described herein are not limited to the specific embodiments described herein. For example, the processes 30 and 50 are not limited to the specific processing order of FIGS. 3 and 5, respectively. Rather, any of the processing blocks of FIGS. 3 and 5 may be re-ordered, combined or removed, performed in parallel or in serial, as necessary, to achieve the results set forth above.

In other embodiments, one or more of the sensor systems may perform different types of processes to determine the set of tasks than the other sensor systems in the network. In these embodiments, the set of tasks determined by one or more of the sensors is substantially the same as the set of tasks determined by the other sensor systems within an accepted tolerance difference.

In one example, in determining the set of tasks in block 82 (FIG. 3), an embedded resource usage benefit calculation based on the broadcasted track predictions of each sensor system is sent to every other sensor system across the network. The embedded resource usage benefit calculation is performed for each task to reduce the total number of paths through the schedule options by retaining only those tasks which significantly improve the particular cost function. In executing the sensor resource utilization process, it is possible, based on the particulars of the multiple sensor system locations and each sensor system's individual capabilities, that the embedded resource usage benefit calculation can eliminate the need for a search of a large number of schedule options, leaving a single possible feasible solution.

The processing blocks in FIGS. 3 and 5 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

Elements of different embodiments described herein may be combined to form other embodiments not specifically set forth above. Other embodiments not specifically described herein are also within the scope of the following claims.

What is claimed is:

1. A method of multiple sensor processing comprising:
   receiving, at a first sensor system, track data from a second sensor system;
   comparing track data from the first sensor system to the track data from the second sensor system to determine if a track will be within a field of view of the first sensor system during a time period;
   determining, at a first sensor system, predicted quality of tracks based on the track data from the first and second sensor systems;
   broadcasting the predicted quality of tracks;
   receiving predicted quality of tracks from the second sensor system; and
   determining a first set of tasks based on the predicted quality of tracks determined by the first sensor system and the predicted quality of tracks received from the second sensor system.

2. The method of claim 1, further comprising:
   receiving, at the second sensor system, track data from a first sensor system;
   comparing track data from the second sensor system to the track data from the first sensor system to determine if a track will be within a field of view of the second sensor system during the time period;
   receiving predicted quality of tracks from the first sensor system; and
   determining a second set of tasks based on the predicted quality of tracks determined by the second sensor system and the predicted quality of tracks received from the first sensor system.

3. The method of claim 2 wherein the first set of tasks and the second set of task are substantially equivalent.

4. The method of claim 1 wherein determining the first set of tasks comprises determining a set of tasks performed by each sensor system.

5. The method of claim 1 wherein determining the first set of tasks comprises determining a first set of tasks using a tabu algorithm.

6. The method of claim 1 wherein determining a first set of tasks comprises determining utilization of resources.

7. The method of claim 1 wherein determining a first set of tasks comprises determining an embedded resource usage benefit calculation based on the broadcasted track predictions.

8. The method of claim 1 wherein determining the predicted quality of tracks comprises determining quality of track observations of the tracks.

9. The method of claim 8 wherein determining the quality of track observations of the tracks comprises determining kinematic measurement variances of the tracks.

10. The method of claim 1 wherein determining the predicted quality of tracks comprises determining resource costs for the tracks.

11. An article comprising a machine-readable medium that stores executable instructions used in multiple sensor processing, the instructions causing a machine to:
    receive, at a first sensor system, track data from a second sensor system;
    compare track data from the first sensor system to the track data from the second sensor system to determine if a track will be within a field of view of the first sensor system during a time period;
    determine, at a first sensor system, predicted quality of tracks based on the track data from the first and second sensor systems;
    broadcast the predicted quality of tracks;
    receive predicted quality of tracks from the second sensor system; and
    determine a first set of tasks based on the predicted quality of tracks determined by the first sensor system and the predicted quality of tracks received from the second sensor system.

12. The article of claim 11, further comprising instructions causing the machine to:
    receive, at the second sensor system, track data from a first sensor system;
    compare track data from the second sensor system to the track data from the first sensor system to determine if a track will be within a field of view of the second sensor system during the time period;
    receive predicted quality of tracks from the first sensor system; and determine a second set of tasks based on the predicted quality of tracks determined by the second sensor system and the predicted quality of tracks received from the first sensor system.

13. The article of claim 12 wherein the first set of tasks and the second set of task are substantially equivalent.

14. The article of claim 11 wherein the instructions causing the machine to determine the first set of tasks comprises instructions causing a machine to determine a set of tasks performed by each sensor system.

15. The article of claim 11 wherein instructions causing the machine to determine the first set of tasks comprises instructions causing the machine to determine a first set of tasks using a tabu algorithm.

16. An apparatus used in multiple sensor processing, comprising:
    circuitry to:
        receive, at a first sensor system, track data from a second sensor system;
        compare track data from the first sensor system to the track data from the second sensor system to determine if a track will be within a field of view of the first sensor system during a time period;
        determine, at a first sensor system, predicted quality of tracks based on the track data from the first and second sensor systems;
        broadcast the predicted quality of tracks;
        receive predicted quality of tracks from the second sensor system; and
        determine a first set of tasks based on the predicted quality of tracks determined by the first sensor system and the predicted quality of tracks received from the second sensor system.

17. The apparatus of claim 16 wherein the circuitry comprises at least one of a processor, a memory, programmable logic and logic gates.

18. The apparatus of claim 16, further comprising circuitry to:
    receive, at the second sensor system, track data from a first sensor system;
    compare track data from the second sensor system to the track data from the first sensor system to determine if a track will be within a field of view of the second sensor system during the time period;
    receive predicted quality of tracks from the first sensor system; and
    determine a second set of tasks based on the predicted quality of tracks determined by the second sensor system and the predicted quality of tracks received from the first sensor system.

19. The apparatus of claim 18 wherein the first set of tasks and the second set of task are substantially equivalent.

20. The apparatus of claim 16 wherein the circuitry to determine the first set of tasks comprises circuitry to determine a set of tasks performed by each sensor system.

21. The apparatus of claim 16 wherein circuitry to determine the first set of tasks comprises circuitry to determine a first set of tasks using a tabu algorithm.

* * * * *

UNITED STATES PATENT AND TRADEMARK OFFICE
CERTIFICATE OF CORRECTION

PATENT NO.         : 7,508,335 B2
APPLICATION NO.    : 11/941402
DATED              : March 24, 2009
INVENTOR(S)        : Cummings et al.

It is certified that error appears in the above-identified patent and that said Letters Patent is hereby corrected as shown below:

Column 1, line 48, delete "aspect the" and replace with -- aspect, the --.

Column 3, line 34, delete "track" and replace with -- tracks --.

Column 4, line 6, delete "system" and replace with -- systems --.

Column 4, line 13, delete "system" and replace with -- systems --.

Column 4, line 20, delete "system" and replace with -- systems --.

Column 4, line 49-50, delete "rather local" and replace with -- rather than local --. (check)

Column 5, line 17, delete "206a a" and replace with -- 206a, a --.

Column 5, line 39, delete "option" and replace with -- options --.

Column 5, line 51, delete "while the second period schedule option 206a.".

Column 5, line 55, delete "option" and replace with -- options --.

Column 6, line 16, delete "schedules" and replace with -- schedule --.

Column 9, line 6, delete "task" and replace with -- tasks --.

UNITED STATES PATENT AND TRADEMARK OFFICE
CERTIFICATE OF CORRECTION

| | | |
|---|---|---|
| PATENT NO. | : 7,508,335 B2 | |
| APPLICATION NO. | : 11/941402 | |
| DATED | : March 24, 2009 | |
| INVENTOR(S) | : Cummings et al. | |

It is certified that error appears in the above-identified patent and that said Letters Patent is hereby corrected as shown below:

Column 10, line 23, delete "task" and replace with -- tasks --.

Signed and Sealed this

Twelfth Day of May, 2009

JOHN DOLL
*Acting Director of the United States Patent and Trademark Office*